Nov. 29, 1938.    A. I. NEWMAN    2,138,527
VARIABLE PRESSURE APPARATUS
Filed June 6, 1935    2 Sheets-Sheet 1
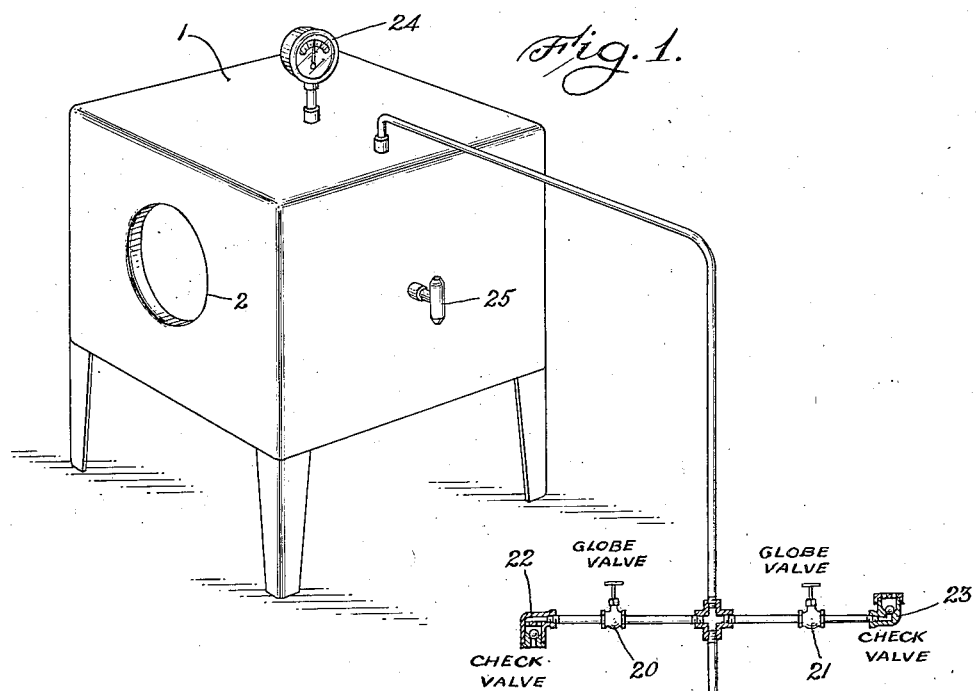
Fig. 1.
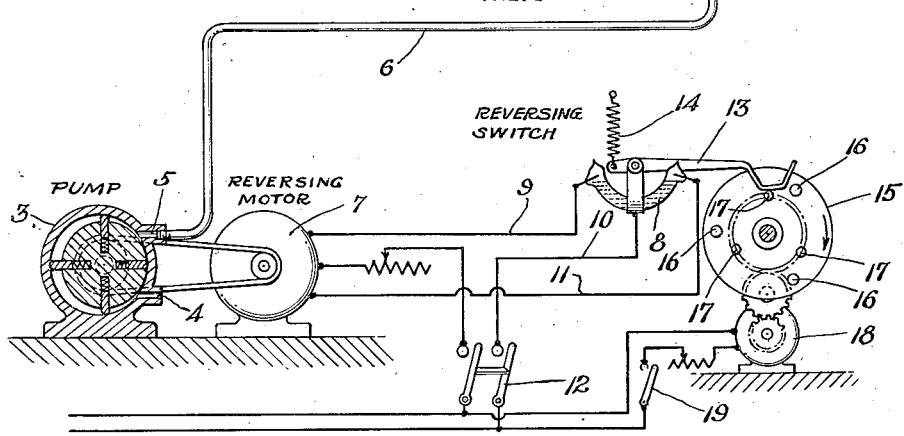
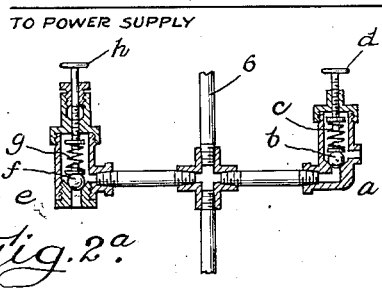
Fig. 2ª.
Inventor;
Alexander I. Newman
BY
Parker Carleon Pitzer & Hubbard
Attorneys.

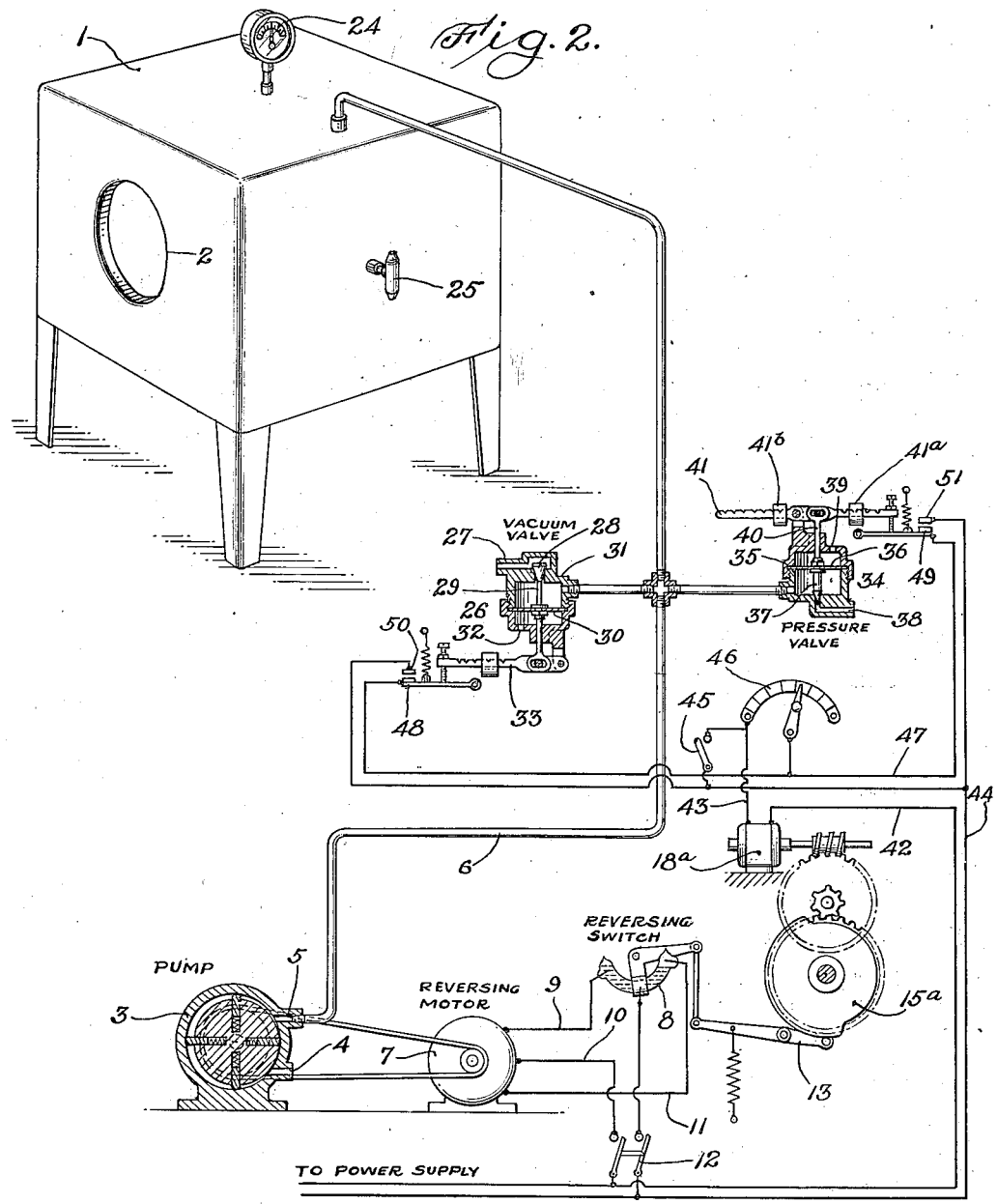

Patented Nov. 29, 1938

2,138,527

UNITED STATES PATENT OFFICE 2,138,527

VARIABLE PRESSURE APPARATUS

Alexander I. Newman, Chicago, Ill.

Application June 6, 1935, Serial No. 25,232

2 Claims. (Cl. 230—42)

This invention relates to apparatus for producing and controlling pressure variations within a container, and particularly to means for automatically producing predetermined variations in pressure either above atmospheric pressure or below atmospheric pressure, or variations extending from above to below atmospheric pressure and vice versa. For convenience, atmospheric and higher pressures will be herein termed positive pressures, and pressures below atmospheric pressure will be referred to as negative pressures.

In the accompanying drawings, Figure 1 is a diagrammatic illustration of one of many possible embodiments of my invention, while Fig. 2 illustrates diagrammatically another embodiment of the invention. Fig. 2ª is a modification that may be made in the apparatus shown in Fig. 1.

Referring to Fig. 1: The numeral 1 denotes a container within which pressure variations are to be produced. This container may be of any construction suited to the purpose for which the pressure variations are desired, as, for example, the treatment of an injured human limb. The container 1 is closed save for any necessary opening (as, for example, the opening 2) through which that which is to be subjected to variable pressures may be inserted.

The means for producing variable pressures within the container 1 may be a pump or blower of any preferred construction, as, for example, a rotary pump 3 having a port 4 leading to the atmosphere, and a port 5 connected by means of a line of pipe 6 with the interior of the chamber 1. The pump 3 is adapted to be driven in either direction so as to increase or decrease positive or negative pressures within the chamber 1. The means for driving the pump 3, first in one direction and then in the other, may be of any desired character. Herein I have shown a reversible electric motor 7 connected to drive the pump 3. Alternations in direction of operation of the motor 7 may be produced in any conventional manner, as, for example, by adjusting the electrical connections between the motor and the power supply. Herein I have shown a motor connected by a reversing switch 8 of the mercury type by means of the wires 9, 10 and 11, the wire 10 being arranged to be connected to the power supply through a switch 12.

The reversing switch 8 may be operated by any suitable means to connect the wire 10 alternately with the wires 9 and 11 to cause the motor to run in one direction or the other. Fig. 1 shows an arm 13 connected to the switch 8 and arranged to be moved in one direction by a spring 14 and in the opposite direction by a disk 15 having pins 16 and 17 arranged to engage the arm 13 and swing said arm from the mid-position shown, wherein the motor is idle, to the position wherein the wires 9 and 10 are connected. When the disk 15 is in such position that the spring 14 may swing the arm 13 down into the space between a pin 17 and the following pin 16, the switch 8 assumes such a position that the wires 10 and 11 are connected in circuit. It will be understood that the arm 13 or the device 15, 16, 17 for operating said arm may be so constructed as to produce dwells of any desired relative length. In Fig. 1 the disk 15 is shown as arranged to be continuously rotated by means of a constant-speed motor 18 connected to the power supply and controlled by a switch 19, but any desired means may be employed to drive said disk. It will be seen that said disk with its pins 16 and 17 is in the nature of a cam.

The means illustrated in Fig. 1 for determining the pressures to be produced within the container 1 comprises two manually operable valves 20 and 21 which may be of the globe type, or any other preferred construction, the valve 20 being connected to the atmosphere through a check valve 22 which is arranged to allow atmospheric pressure to enter the system, and the valve 21 being connected to the atmosphere through a check valve 23 adapted to allow pressure to escape to the atmosphere.

If desired, the chamber 1 may be provided with a pressure gauge 24 and a safety relief device 25.

The operation of the apparatus shown in Fig. 1 is as follows: The valves 20 and 21 are opened to allow a slight leakage. The switches 12 and 19 are then closed, whereupon the motor 7 will be operated first in one direction and then in the other to increase and decrease the pressure within the container 1. The speed of the disk 15 is arranged to produce reversal of the motor 7 after the pressure in the container 1 has reached the desired point; or the leakage through the valves 20 and 21 may be adjusted so that reversal of the motor shall occur at the time the pressure reaches the desired point; or the valves may be so adjusted that reversal occurs some time after the pressure has reached the desired point, thus enabling the operator to apply the maximum pressure and the minimum pressure for predetermined periods of time.

When variations in positive pressures are being produced, the check valve 22 will remain closed, while the valve 21 and the check valve 23 allow the escape of excess pressure, the relief valve 25 serving to relieve the pressure in the container 1 if the pressure should rise above a predetermined maximum before the motor 7 is reversed.

When variations in negative pressures are being produced, the check valve 23 remains closed, while the valve 20 and the check valve 22 allow atmospheric pressure to enter the system. If the pressure in the container 1 should go below a predetermined minimum before the motor 7 is reversed, the relief device 25 operates to permit atmospheric pressure to enter the chamber.

If the pressure within the container 1 is being caused to fluctuate from positive to negative atmospheric pressure and vice versa, the valves 20 and 22 and the valves 21 and 23 act alternately to control the pressures produced in the system.

Changes in the range of the variations, and changes in the timing of the variations may be accomplished by correspondingly arranging the contour of the cam 15, 16, 17, or by changing the speed of the motor 7 or the motor 18.

Fig. 2ª illustrates a form of valve which may be used in lieu of those shown in Fig. 1. The valve a comprises a valve member b (herein shown as having the form of a ball) which is held to its seat by a spring c, the pressure of which may be adjusted by means of the screw d. It will be seen that pressure within the system above a predetermined point will escape past the valve member b to the atmosphere, but that atmospheric pressure cannot enter the system past said valve member.

The valve e comprises a valve member f which is pressed against its seat by a spring g, the pressure of the latter being adjustable by means of a screw h. When positive pressure is being created in the system, the valve member f prevents escape thereof to the atmosphere, but when there is negative pressure in the system, the valve member f opens when the predetermined minimum is reached.

In Fig. 2, the numerals 1, 2, 3, 4, 5, 6, 7, 8, 9, 10, 11, 12, 24 and 25 denote parts which may be similar to those correspondingly designated in Fig. 1. 26 is a valve connected to the line 6 and having an outlet 27 to the atmosphere, said outlet being controlled by a valve 28 having a stem 29 that is connected to a diaphragm 30 in the valve casing 31. The space at one side of the diaphragm 30 communicates with the line 6, while the space at the opposite side of the diaphragm communicates with the atmosphere through the port 32. The stem 29 is connected to a weighted lever 33 that tends to hold the valve 28 closed.

A valve 34 also is connected to the line 6, said valve comprising a valve casing 35 containing a diaphragm 36. A valve member 37 is connected to the diaphragm. The space at one side of the diaphragm 36 is connected to the line 6 and said space is connected to the atmosphere through a port 38 which is controlled by the valve 37. The space at the opposite side of the partition communicates with the atmosphere through a port 39. The stem 40 of the valve 37 is connected to a weighted two-arm lever 41. The weight 41ª may be adjusted to counterbalance positive pressure within the system, while the weight 41ᵇ may be utilized to counterbalance atmospheric pressure on the upper side of the diaphragm when variations in negative pressure are being produced.

It will be seen that positive pressure in the system above a predetermined amount will cause the valve 37 to be unseated to allow the excess pressure to escape through the port 38, and that a negative pressure in the system below a predetermined point will allow atmospheric pressure acting upon the lower side of the diaphragm 30 to unseat the valve 28 to allow air to enter through the port 27.

The motor-reversing switch 8 is shown in Fig. 2 as arranged to be operated by a cam 15ª which is driven by a motor 18ª, said motor being started and stopped by means controlled by the valves 26 and 34. The motor 18ª is connected to the power supply through wires 42, 43 and 44. 45 indicates a starting switch included in the wire 43, and 46 denotes a speed-regulating device connected between the wire 43 and a wire 47 connected to a switch point 48 that is controlled by the lever 33 and a switch point 49 that is controlled by the lever 41. 50 and 51 are switch points coacting with the switch points 48 and 49, respectively, the switch points 50 and 51 being connected to the wire 44.

Assuming that positive pressure is being built up in the container 1, it will be seen that when the pressure reaches a predetermined point the valve 37 will be automatically opened, thereby causing closure of the switch points 49 and 51, whereupon a circuit will be closed through the motor 18ª to operate the mercury switch 8 to reverse the motor 7. The resulting reduction in pressure in the system will cause the switch 49—51 to be opened, thus stopping the motor 18ª.

When the pressure has been reduced to a predetermined point, the valve 28 will be automatically opened and the switch 48—50 closed, thereby closing a circuit through the motor 18ª to operate the mercury switch 8 to reverse the motor 7. The resulting increase in pressure in the system will cause the switch 48—50 to close, thereby stopping the motor 18ª.

If negative pressures are to be produced and varied, the weights 41ª and 41ᵇ are adjusted so that atmospheric pressure on the upper side of the diaphragm will be suitably counterbalanced. When the pump has reduced the pressure in the system to the predetermined point, the valve 28 is unseated, the switch 48—50 closed, and the pump reversed. When the pressure rises to the predetermined point, the valve 37 is opened, the switch 49—51 closed and the pump reversed.

When pressures are being alternated from above to below atmospheric pressure and vice versa, the weights 41ª and 41ᵇ are adjusted so that the switch 49—51 will close as the upper limit is reached.

The adjustment of the levers 33 and 41, the speed of the motor 18ª, and the contour of the cam 15ª determines how much variation in pressure will be produced, whether the variations shall be in positive or negative pressure or both, and the length of time between reversals.

It will be understood that the valve members 28 and 37 (Fig. 2) serve the purpose of the check valves 22 and 23 of the embodiment shown in Fig. 1.

Attention is directed to the fact that by reason of the reversibility of the rotary pump 3 a single one of the ports 4 and 5 is used for both increasing and decreasing the pressure in the system; it being apparent that either of these ports may be connected to the line 6.

The apparatus herein disclosed may be readily constructed in the form of a small portable unit.

Although the invention has been herein described as comprising only one container, it will be appreciated that more than one container may be used, if desired, and that where a plurality of containers are employed they may be arranged in series or in parallel, shut-off valves being provided to shut off any container that is not to be used at a given time.

In the following claims, the term "pump" is used for the sake of brevity to denote any equivalent means for forcing air into or withdrawing air from the container.

I claim as my invention:

1. In a pneumatic system for producing a periodically varying pressure, the combination of a reversible pump having two ports, means for permanently connecting one of said ports to a container in which the pressure is to be periodically varied above and below a median value, the other of said ports being permanently open to atmosphere, a reversible electric driving motor operatively connected to said pump for driving the same in first one direction and then the other to cause a corresponding alternate flow of air into and out of said one port, and control means for periodically reversing said power actuating means with a predetermined periodicity.

2. In a pneumatic system for producing a periodically varying pressure, the combination of a reversible pump having two ports, means for permanently connecting one of said ports to a container in which the pressure is to be periodically varied above and below a median value, the other of said ports being permanently open to atmosphere, a reversible electric driving motor operatively connected to said pump for driving the same in first one direction and then the other to cause a corresponding alternate flow of air into and out of said one port, adjustable control means for periodically reversing said power actuating means with a predetermined periodicity, and means responsive to the pressure at said other port for actuating said control means to reverse said motor when said pressure attains predetermined limit values.

ALEXANDER I. NEWMAN.